United States Patent [19]
Choi

[11] Patent Number: 5,610,892
[45] Date of Patent: Mar. 11, 1997

[54] SHUTTER FOR PREVENTING DOUBLE INSERTION AND DISC PLAYER HAVING THE SAME

[75] Inventor: Youngsuk Choi, Seoul, Rep. of Korea

[73] Assignee: Daewoo Electronics Co., Ltd., Seoul, Rep. of Korea

[21] Appl. No.: 365,629

[22] Filed: Dec. 28, 1994

[30]  Foreign Application Priority Data

Dec. 28, 1993 [KR] Rep. of Korea ................... 93-30153

[51] Int. Cl.⁶ .......................... G11B 33/02; G11B 17/04; G11B 17/035
[52] U.S. Cl. ........................ 369/77.2; 360/99.06
[58] Field of Search .................. 369/75.2, 75.1, 369/77.1, 77.2; 360/99.02, 99.03, 99.06, 99.07

[56]  References Cited

U.S. PATENT DOCUMENTS

| 4,691,257 | 9/1987 | Taguchi | 360/97 |
|---|---|---|---|
| 5,067,121 | 11/1991 | Einhaus | 369/75.2 |
| 5,172,362 | 12/1992 | Hattori et al. | 369/77.2 |
| 5,300,763 | 4/1994 | Ito et al. | 369/77.1 X |
| 5,301,179 | 4/1994 | Okamoto | 369/77.2 |

FOREIGN PATENT DOCUMENTS

| 58-45656 | 3/1983 | Japan | 369/77.1 |
|---|---|---|---|
| 58-45659 | 3/1983 | Japan | 369/77.1 |
| 58-57663 | 4/1983 | Japan | 369/77.1 |
| 1123051 | 6/1986 | Japan | 360/99.06 |
| 61-214168 | 9/1986 | Japan | 369/77.2 |
| 62-256260 | 11/1987 | Japan | 369/77.2 |

*Primary Examiner*—Stuart S. Levy
*Assistant Examiner*—William J. Klimowicz
*Attorney, Agent, or Firm*—Lowe, Price, LeBlanc & Becker

[57]  ABSTRACT

A shutter for preventing double insertion with a simple machinery mechanism without giving a disc in a disc player impacts when inserting another disc, and a disc player having the shutter. The shutter has elastic members located above a disc cartridge insertion opening. At the lower end of the elastic members a shutter plate for opening and shutting vertically is provided. A lower part of an inside wall of the shutter plate is inclined toward its outside wall. Guide pieces are provided at side edges of shutter plate for guiding the shutter plate in the vertical direction. When the disc cartridge is inserted into a tray through the disc cartridge insertion opening which is projected outward of a housing, a front portion of the tray is inserted into the housing, and the shutter plate disposed thereon is slid straight down to shut the disc cartridge insertion opening. Thus, since the shutter is closed in a loading state, another disc can not be double inserted. In an ejecting operation, the tray with the disc cartridge is moved forward, and at this time, the tray pushes to raise up the inclined inside wall of the shutter to be able to eject the disc cartridge.

4 Claims, 5 Drawing Sheets

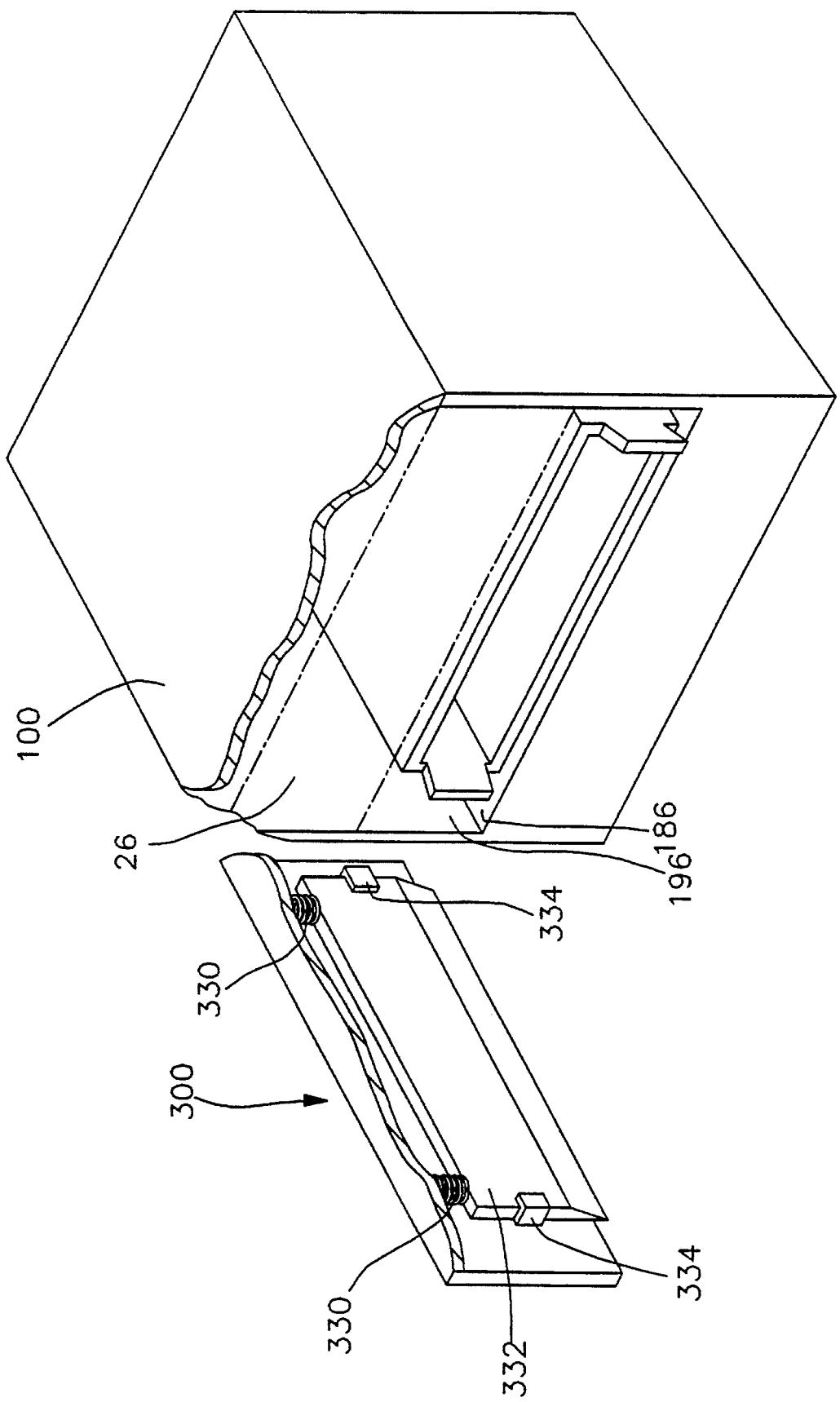

SHUTTER FOR PREVENTING DOUBLE INSERTION AND DISC PLAYER HAVING THE SAME

BACKGROUND OF THE INVENTION

1. Field of the Invention

The present invention relates to a shutter for preventing double insertion and a disc player mounting the same, more particularly, to a shutter for preventing double insertion of a disc by means of a simple machinery mechanism and a disc player having the same.

2. Description of the Prior Arts

In general, disc players can record information on and/or reproduce information from discs of magnetic or optical type such as optical video disc, digital audio disc, or compact disc, etc. There are several methods for loading the discs into the player and unloading them therefrom. A disc player of the front loading type wherein a tray having the disc mounted thereon is moved in the horizontal direction and then downward in the vertical direction thereby causing the disc to be mounted above a turntable is disclosed in U.S. Pat. No. 5,025,339 (issued to Kanno et al.). A disc loading device used in that of a front loading type is frequently employed. Recently, the disc player continues to be developed, especially the disc player of such a front loading type is greatly being developed.

The conventional disc player of the front loading type will be described in detail with reference to FIGS. 1 and 2.

FIG. 1 is an exploded perspective view for showing a conventional disc player of the front loading type. FIG. 2 is an enlarged sectional view for showing a pressing unit in FIG. 1. As shown in FIG. 1, reference numeral 10 denotes a disc tray for receiving a disc cartridge. Lower ends of side walls 12 of disc cartridge 10 are inwardly bent to form cartridge support pieces 14 for supporting the disc cartridge to be inserted thereinto or ejected therefrom. A tray guide rod 16 is formed on the outer surfaces of side walls 12 of disc tray 10. A moving plate 20 is provided with guide grooves 26 and guide rods 28 which are placed on its side walls. Guide rods 28 which are provided on the left and right sidewalls of disc tray 10 can slide along guide groove 38 while being inserted thereinto so that disc tray 10 can be moved into and from the housing. When loading and unloading the disc cartridge carried by disc tray 10 and moving plate 20 on the turntable, guide rod 28 can be slidably provided within and along guide groove 38 formed on the side walls of loading unit B supporting disc tray 10 and moving plate 20.

Pressing unit P is provided over loading unit B. Pressing unit P has a cone arm 91 which is generally of an elongated plate shape and is extended from the upper portion of the front of loading unit B to a position corresponding to the center of loading unit B. A cone disc 93 supported at the tip end of cone arm 91 is located above the center of loading unit B. Thus, when tray 10 moves horizontally together with moving plate 20 during the loading operation, cone arm 91 gradually moves pivotally downward, and then when tray 10 moves vertically downward, cone disc 93 is moved vertically downward to be located at its lowermost position so that it can press the disc. As shown in FIG. 2, an angle member 92 is fixedly attached to cone arm 91 near the proximal end thereof with its portion extending downward. When the disc is in a loaded state, angle member 92 is moved downward together with cone arm 91 due to the pivoting and downward movements of cone arm. Therefore, this angle member acts as a stop member when inserting another disc so that the double insertion of the disc can be prevented.

Meanwhile, below loading unit B there are provided a spindle assembly 23 for rotating the disc mounted thereon and a pickup apparatus for reading and writing information from the disc which is rotated by the spindle assembly with the movement in the radial direction of the disc under the disc. The disc player is provided with a loading drive system (not shown) which has a loading motor, a transmittance gear and a moving plate carrying gear for driving the loading unit, and is provided with a power supply unit (not shown) for transmitting a driving force to pickup apparatus 24. Disc tray 10 and moving plate 20 are guided along guide grooves 38 formed in loading unit B by the power supply unit and the loading drive system in the front loading method to load and unload the disc on the turntable.

However, in the conventional disc player having the above structure, the member for preventing double insertion is liable to shake or break. Furthermore, since the above member is in close connection with the disc on the turntable, if one tries to insert another disc while reading or reproducing information from a disc, impacts affect directly the original disc to deteriorate the reliability of products. Moreover, while loading and unloading the disc cartridge on the turntable, the carrying operation of the tray is performed by means of the loading drive system (provided with the loading motor, the transmittance gear and the moving plate carrying gear) and the moving plate, so that the internal structure of the disc player has become complicated. Further, due to heavy and large-sized products, this conventional structure goes against the recent trends relating to the miniaturization of the disc player.

SUMMARY OF THE INVENTION

The present invention is intended to overcome the above-mentioned and numerous other disadvantages and deficiencies of the prior art. Therefore, it is a first object of the present invention to provide a shutter for preventing double insertion by means of a simple machinery mechanism without giving a disc in a disc player impacts when inserting another disc.

A second object of the present invention is to provide a disc player having the above shutter.

To achieve the above first object of the present invention, the shutter for preventing double insertion includes:

a housing having a disc cartridge insertion opening into which a disc cartridge is inserted;

elastic members of which each of first ends is located above the disc cartridge insertion opening on an inside wall of the housing to generate an elastic force in a lower direction;

a shutter plate which is provided below the elastic members on the inside wall of the housing, wherein an upper edge of the shutter plate is connected to the other ends of the elastic member in order to open and shut in a vertical direction elastically, and wherein a lower part of an inside wall of the shutter plate is inclined toward its outside wall so that the shutter plate can be pushed upward by an end of the disc cartridge when ejecting the disc cartridge; and guide pieces which are provided at side edges of shutter plate for guiding the shutter plate in the vertical direction without the shutter plate being separated from the housing.

To achieve the above second object of the present invention, the disc player mounting the shutter includes:

a housing;

a base plate provided on a bottom of the housing;

a deck provided with a spindle assembly disposed above the base plate;

a disc tray which is provided above the deck for carrying the disc cartridge, into which a disc cartridge is inserted from a disc cartridge insertion opening of the housing;

disc cartridge loading members each having an operating piece wherein its first upper position is connected to a side of the disc tray and its first lower position is connected to a side of the deck, a first elastic member having an elastic force wherein a first end thereof is connected to a second upper position of the operating piece and a second end thereof is connected to the deck to generate a first elastic force in an opposite direction of an insertion of the disc cartridge, and a second elastic member wherein a first end thereof is connected to a second lower position of the operating piece and a second end thereof is connected to the deck to generate a second elastic force in a lower direction;

an ejecting member for ejecting the disc cartridge in the disc tray;

elastic members of which each of first ends is located above the disc cartridge insertion opening on an inside wall of the housing to generate a elastic force in a lower direction;

a shutter plate which is provided below the elastic members on the inside wall of the housing, wherein upper edge of the shutter plate is connected to the other ends of the elastic member in order to open and shut in the vertical direction elastically, and wherein a lower part of an inside wall of the shutter plate is inclined toward its outside wall so that the shutter plate can be pushed upward by an end of the disc cartridge when ejecting the disc cartridge; and guide pieces which are provided at side edges of shutter plate for guiding the shutter plate in the vertical direction without the shutter plate being separated from the housing.

To achieve the above-described object of the present invention, in the disc cartridge loading member of the disc player, the first upper position of the operating piece is hinged to the side of the disc tray, the first lower position of the operating piece has a guide projection, a position of the deck corresponding to the first lower position of the operating piece is provided with a vertical elongated groove into which the guide projection is slidably inserted, and the loading member has a first spring connected to the upper front edge of the operating piece and the deck to move the tray elastically in a forward direction, and a second spring connected to the base of the operating piece and the deck to move the operating piece elastically in the lower direction.

The ejecting member of the disc player has a front portion having a width corresponding to that of the deck and disposed below the deck, a pressing button formed at a center of the front portion in the front direction, ejecting rods extended inwardly on two sides of inner walls of the front position, a guide bracket for guiding the ejecting rods inwardly and ejecting springs disposed in front of the guide bracket, and respectively inserting the ejecting rods thereinto, and elastically rebounding from the guide brackets when the ejecting rods are pushed inwardly.

According to the shutter for preventing double insertion and a disc player mounting the shutter of the present invention, when the disc cartridge is inserted into the disc cartridge insertion opening, the tray is pushed in its inserting direction so that the front portion of the tray is inserted into the housing, and the shutter plate disposed thereon is slid straight down to shut the disc cartridge insertion opening. On the other hand, the second spring is strained in the insertion direction due to the movement of the tray and erect the operating piece, so that the tray is moved downward by restoring force of the strained first spring thereby to complete a loading operation of the disc cartridge.

Thus, while the loading operation of the disc is completed and the disc is put on the turntable, the shutter is closed so that another disc can not be inserted into the housing. When the pressing button is pushed which is protruded at the front of the housing, the eject rods are pushed inward to push up the operating piece, and so the tray is moved forward by restoring force of the strained second spring. At this time, the tray pushes the inclined inside wall of the shutter to open the shutter, with the result that the ejecting operation of the disc cartridge is completed.

BRIEF DESCRIPTION OF THE DRAWINGS

The present invention may be better understood and its numerous objects and advantages will be more apparent to those skilled in the art by reference to the accompanying drawings in which:

FIG. 3 is an exploded perspective view for showing a disc player mounting a shutter for preventing double insertion according to an embodiment of the present invention;

DESCRIPTION OF THE PREFERRED EMBODIMENTS

The preferred embodiments of this invention will be described in detail with reference to the accompanying drawings.

Figure 4:
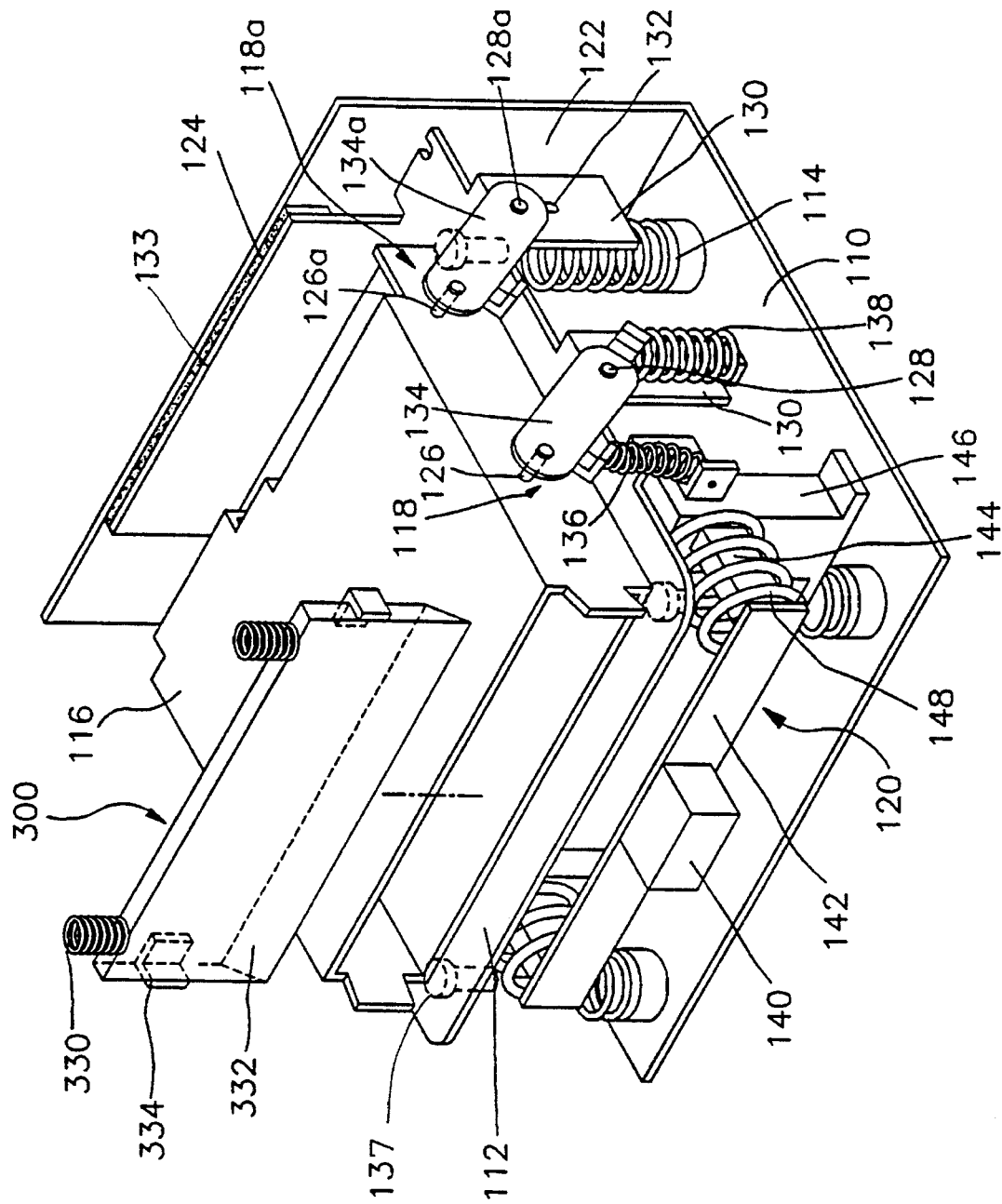
FIG. 4 is an exploded perspective view for showing a disc player of FIG. 3.

FIG. 3 is an exploded perspective view for showing a disc player mounting a shutter for preventing double insertion according to one embodiment of the present invention. FIG. 4 is an exploded perspective view for showing a disc player of FIG. 3.

As shown in the figures, a base plate 110 is disposed on the bottom of housing 100 (see FIG. 6) of the disc player. A rear end edge of base plate 110 is bent upward to form a first stopper 122. A buffering pad 124 used for absorbing impacts is formed on an inner side of a top end of stopper 122. A deck 112 to which spindle assembly (not shown) with a turntable, a spindle motor and a spindle axis are secured is disposed over base plate 110. Projections 137 on which springs, etc., can be hooked are disposed on four edges of deck 112. The rear portion of deck 112 is bent upwardly to form a second stopper 133. Two or more quide pieces 130 extend downward in a vertical direction on a predetermined position of each of the side edges of deck 112. An elongated guide groove 132 is formed vertically on each of guide pieces 130. The top portion of guide groove 132 is preferably bent forward and parallel with the inserting direction of the tray. Damping members 114 are inserted into and secured to portions of base plate 110 corresponding to each of the projections 137 formed on a lower portion of deck 112, so that deck 112 can be mounted on base plate 110 at a floating state. A tray 116 for carrying a disc cartridge mounted therein is provided above deck 112.

On the front side of housing 100 is provided disc cartridge insertion opening 196 for inserting disc cartridge 150 into tray 116 or for ejecting it from tray 116. The front portion of tray 116 into which disc cartridge 150 is to be inserted is provided passably through disc cartridge insertion opening 196 of housing 100. Tray support 186 is integrally extended inwardly and horizontally from lower edge of disc cartridge insertion opening 196. The front portion of the tray is supported on support 186 of disc cartridge insertion opening 196 before inserting the disc cartridge.

Two or more shutter springs 330 are located above disc cartridge insertion opening 196 on an inside wall of housing 100. One end of each shutter spring 330 is secured at the predetermined position above disc cartridge insertion opening 196. Shutter plate 332 is provided below shutter spring 330 on the inside wall of housing 100. The upper edge of shutter plate 332 is connected to the other end of each of shutter springs 330 so that shutter plate 332 can be moved in the vertical direction elastically to open and shut vertical disc cartridge insertion opening 196 of housing 100. Guide pieces 334 are provided on the inside wall of housing 100 at both of side edges of shutter plate 332. By this way, shutter plate 332 is guided on the inside wall of the housing by guide pieces 334 in the vertical direction without shutter plate 332 being separated from housing 100. The lower part of the inside wall of shutter plate 332 is inclined toward its outside wall, and the outside wall of shutter plate 332 is generally flat.

Meanwhile, deck 112 and tray 116 are connected to each other by using cartridge loading members 118 formed on their sides, so that tray 116 may be mounted on deck 112 at the floating state. Each cartridge loading member 118 has an operating piece 134 having a panel shape and first and second springs 136 and 138 of which respective ends are connected to upper and lower portions of operating piece 134. The upper portion of operating piece 134 is hinged on a corresponding position of the side of tray 116 and the lower portion of operating piece 134 is provided with a guide projection 128 which is to be slidably inserted into elongated guide groove 132 formed in guide piece 130 formed on the side of deck 112. One end of first spring 136 is connected to a lower end of operating piece 134 and the other end thereof is connected to a lower end of the guide piece 130 formed on the side of deck 112, so that tray 116 can be elastically moved in downward direction along the elongated guide groove 132. One end of first spring 136 is secured to a front edge of the upper portion of operating piece 134 and the other end thereof is secured in front position of guide piece 130 in the side of deck 112, so that tray 116 can elastically be moved in a front direction. Here, the elasticity of second spring 138 is preferably greater than that of first spring 136.

As described above, deck 112 and tray 116 are mutually connected thereto by using cartridge loading members 118 formed on their sides. In addition, in order to maintain a little more the horizontal state and the balance of deck 112 and tray 116, auxiliary loading members 118a each provided with an operating piece 134a of panel shape can preferably be disposed on their sides. Here, the upper positions of operating pieces 134a are respectively hinged on sides corresponding to tray 116 by means of hinge axes 126a formed on sides of tray 116. Guide projections 128a are formed inwardly on a lower portion of operating piece 134a.

Therefore, each guide projection 128a is slidably inserted into elongated guide groove 132 formed at a portion of guide piece 130 corresponding to the side of deck 112.

An ejecting device 120 is disposed below deck 112. A front 142 of ejecting device 120 is in a panel shape. It has a width corresponding to that of deck 112 and is formed at a position corresponding to the front of deck 112. A pressing button 140 is integrally projected forward of the housing on a center portion of front 142 of ejecting device 120 (see FIG. 6). Ejecting rods 144 are extended inside of housing and to the lower portion of guide groove 132 of guide piece 130. To guide ejecting rods 144 inside of housing 100, guide brackets 146 are disposed on base plate 110. Each of the guide brackets 146 has a through hole into which ejecting rod 144 can be slidably moved. Ejecting rods 144, which are inserted through ejecting springs 148, penetrate respectively through the through holes of guide brackets 146 to be extended to lower end of guide groove 132 of guide piece 130. Thus, when pushing ejecting rod 144 inward of housing 100, ejecting spring 148 can elastically rebound against guide bracket 146. The extended ends of ejecting rods 144 each of which is inclined downward at a predetermined angle so as to push up operating piece 134 of loading member 118.

Hereinafter, an operation of the disc player according the present embodiment will be described.

Figure 1:
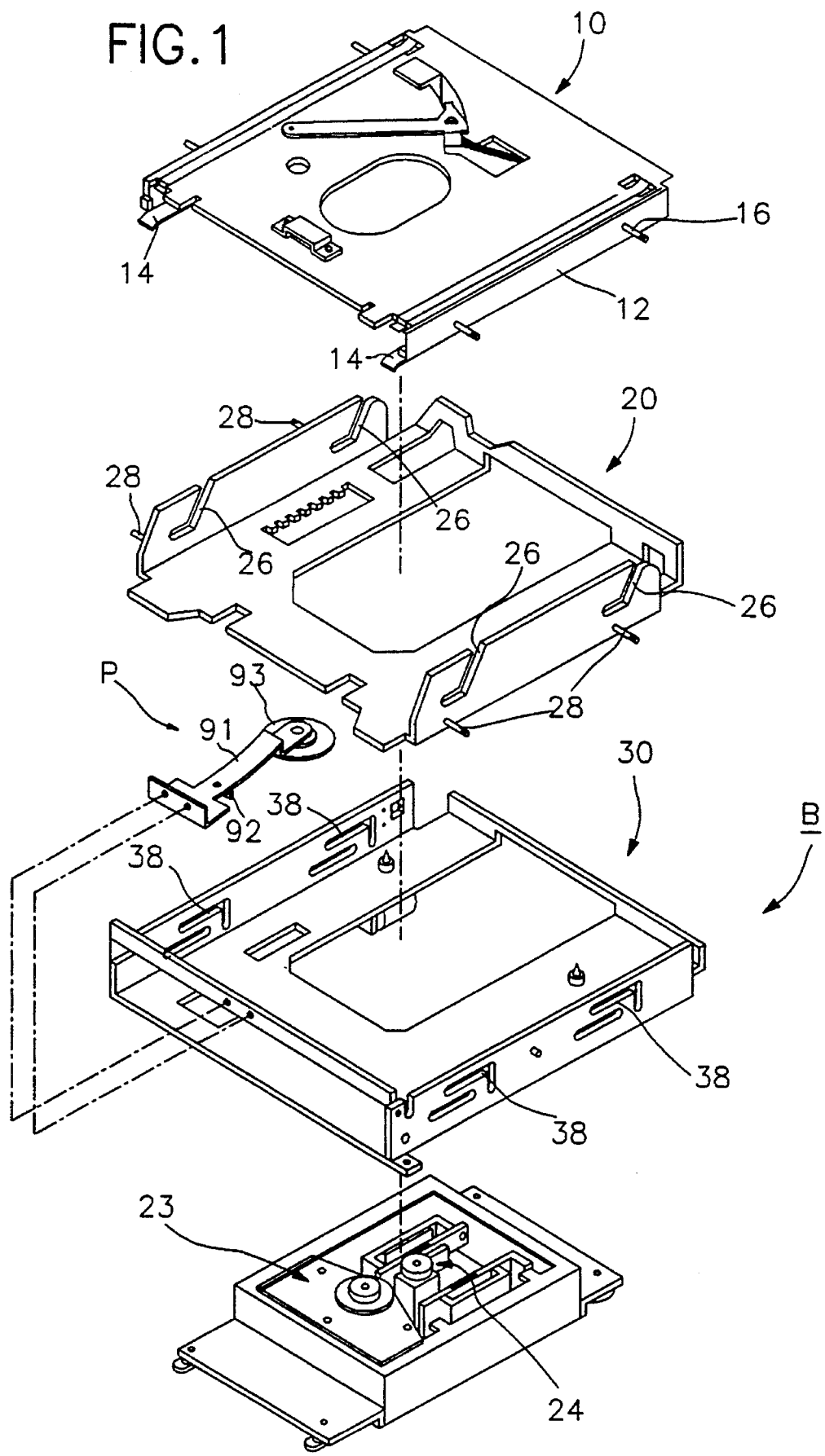
FIG. 1 is an exploded perspective view for showing a conventional disc player of a front loading type.
Figure 2:
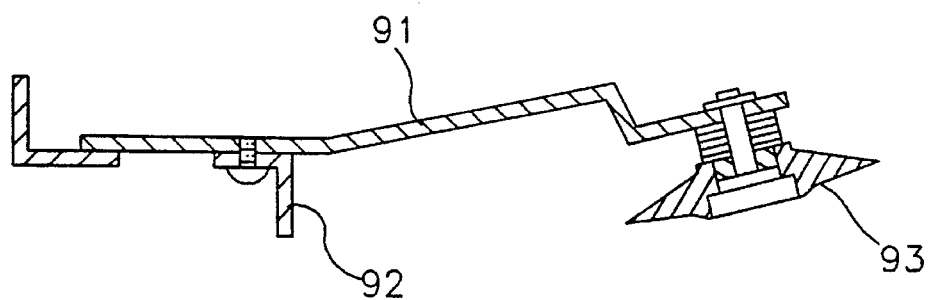
FIG. 2 is an enlarged sectional view of the pressing unit as shown in FIG. 1.
Figure 7:
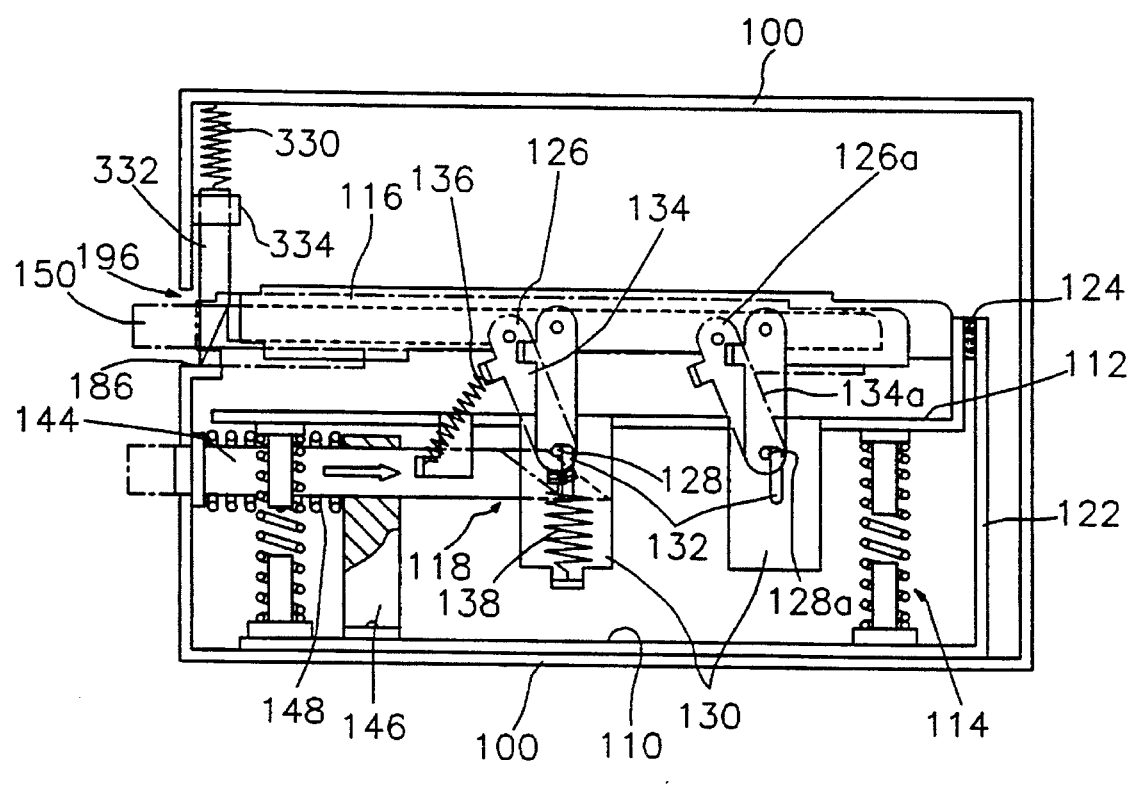
FIG. 7 is a side view for showing an inside of a disc player of FIG. 3 at a state of an ejecting operation of a disc cartridge.
Figure 5:
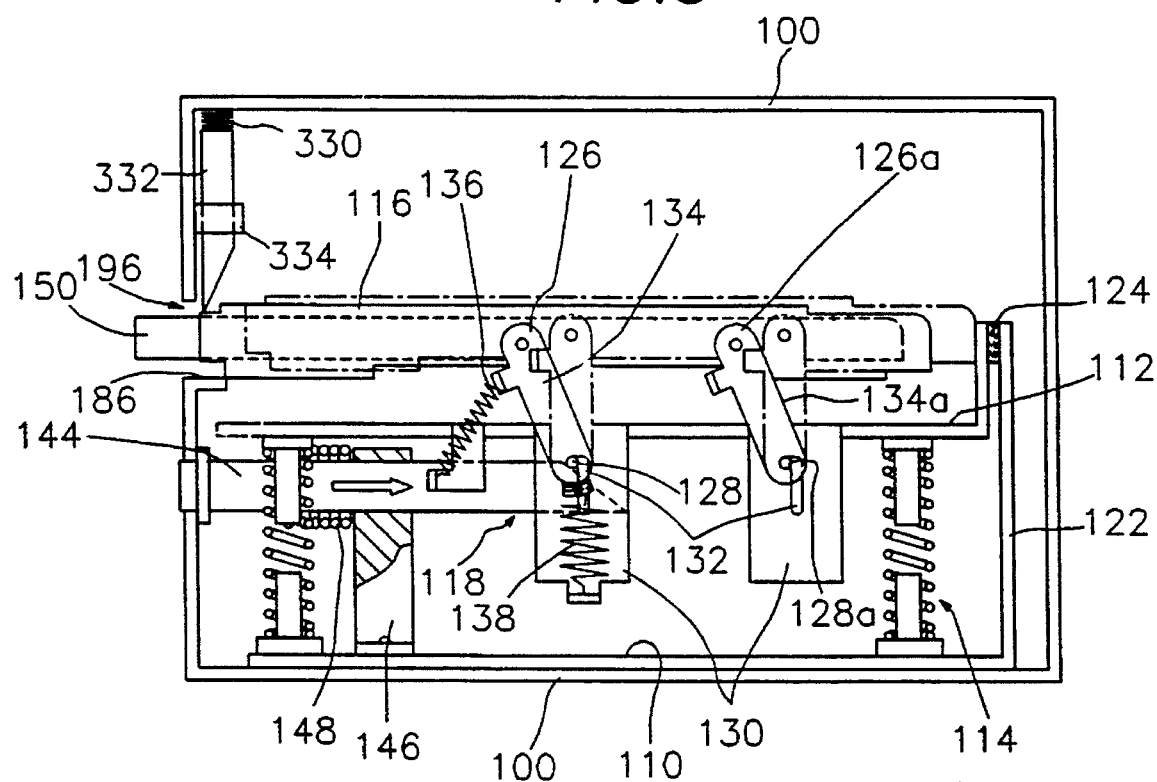
FIG. 5 is a side view for showing an inside of a disc player of FIG. 3 at an initial state before inserting a disc cartridge thereinto.
Figure 6:
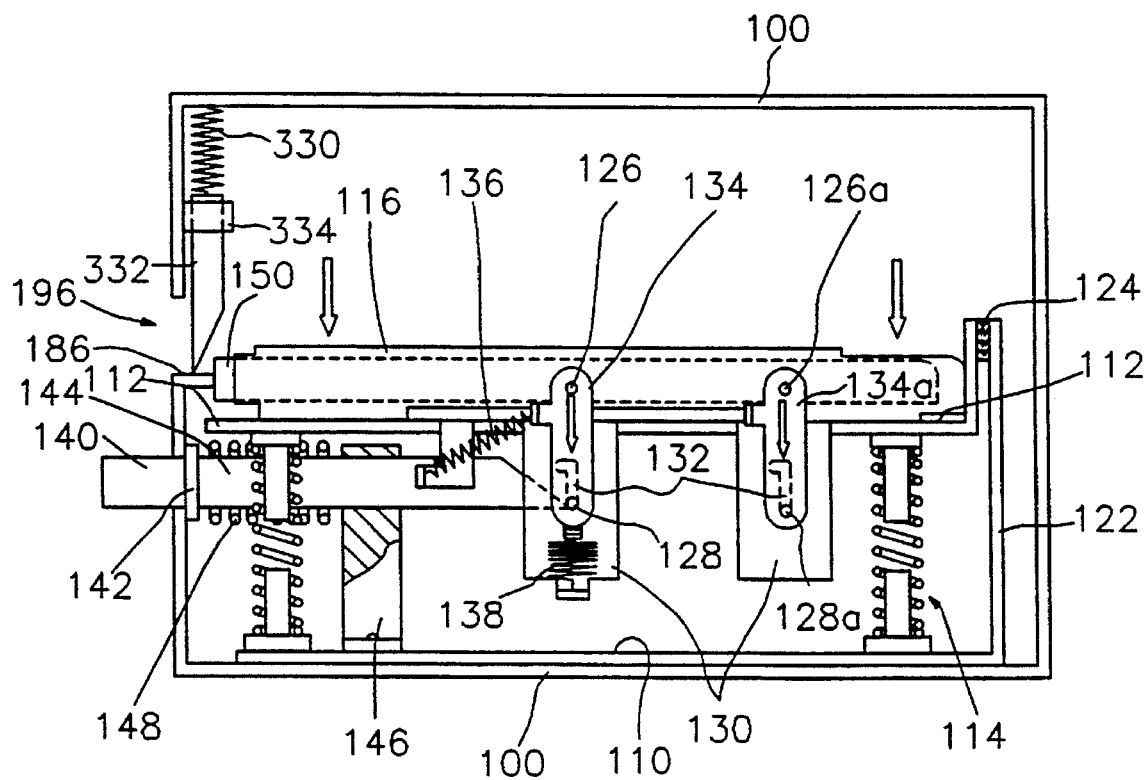
FIG. 6 is a side view for showing an inside of a disc player of FIG. 3 at a completed state of a loading operation of a disc cartridge.

FIG. 5 is a side view for showing an inside of a disc player at an initial state before inserting a disc cartridge, FIG. 6 is a side view for showing an inside of a disc player at a completed state of a loading operation of a disc cartridge, and FIG. 7 is a side view for showing an inside of a disc player at a state of an ejecting operation of a disc cartridge. As shown in FIG. 5, before the insertion of the disc cartridge thereinto, tray 116 is fixedly mounted on tray support 186 of disc cartridge insertion opening 196 of housing 100. Shutter plate 332 is provided on the front of tray 116 with shutter spring 330 of a compressed state. Each of side edges of shutter plate 332 is slidably supported by guide piece 334 on the inside wall of housing 100. Therefore, shutter plate 332 is moved in the vertical direction without shutter plate 332 being separated from housing 100. Since disc cartridge loading member 118, which has operating piece 134, first spring 136 connected to a front edge of the upper portion of operating piece and second spring 138 connected to a lower end thereof, is hinged on tray 116, first and second springs 136 and 138 connected to deck 112 are strained. In the state before inserting of a disc, since first spring 136 is strained upward within guide groove 132 of deck 112 so that it is maintained in the strained state due to tray support 186 and the bent top portion of guide groove 132, and at the same time second spring 138 of which an elastic force is greater than that of first spring 136 is strained forward, operating piece 134 tends to be rotated forward centering on guide projection 128 formed on the lower end of operating piece 134, and thus guide projection 128 of the lower end of operating piece 134 is in a state being rotated by a predetermined angle forward centering on projection 128 from the upper end of guide piece 130.

At that initial state, when a user inserts the disc cartridge thereinto, the front end of cartridge 150 comes in contact with the rear end of tray 116 to push tray 116. Thus, the front of tray 116 enters housing 100 so that shutter plate 332 can be moved down to close disc cartridge insertion opening 196. On the other hand, when tray is pushed into the housing 100, second spring 138 is strained in the insertion direction, i.e., rearward of housing 100. Therefore, as shown in dotted line in FIG. 5, operating piece 134 stands erect. Thereafter, guide projection 128 slides rearward along the bent top portion of guide groove 132. As shown in FIG. 7, the strained first spring 136 is pulled downward by its restoring force, guide projection 128 formed on the inner wall of the lower end of operating piece 134 is pulled in the downward direction of guide groove 132 formed at guide piece 130 formed on the deck side, so that tray 116 into which the disc is inserted is mounted on the top of deck from an initial floating state thereby to complete the loading operation.

Here, operating piece 134a of auxiliary loading member 118a is moved together with operating piece 134 to maintain the horizontal state and the balance of tray 112 and deck 116, and also to absorb impacts caused by elasticity of first and second springs 136 and 138.

Since shutter plate 332 is formed flatly and the shutter is closed in the loading state of the disc cartridge, when one tries to insert another disc cartridge into housing 100, shutter plate 332 can not be opened so that the another disc can not be double inserted into the housing.

To eject disc cartridge 150 from the loaded state, when a user facing the front of housing 100 pushes a pressing button 140 which is projected forward of housing 100, ejecting rods 144 disposed on the inner wall of the front portion thereof are moved inwardly, so that guide projection 128 of loading member 118 disposed on the lower end of guide groove 130 of deck 112 is moved to the top of guide groove 132 along the inclined surface of the front end of ejecting rod 134, and thereafter guide projection 128 is slid forward of housing 100 within the bent top portion of guide groove 132 by the restoring force of second spring 138 as shown in FIG. 7. Sequentially, the restoring force of second spring 138 having a greater elastic force than that of first spring 136 is applied to tray 116, so that operating piece 134 is rotated forward centering around guide projection 128, and then tray 116 is moved forward to eject disc cartridge 150. At this time, since the lower part of the inside wall of the shutter plate 332 is inclined toward its outside wall, the shutter is pushed outward to be opened. By this way, the ejecting operation is completed.

According to the shutter for preventing double insertion and a disc player having the same in accordance with the present invention, since a shutter plate which is provided on the front inside wall of the housing over the tray comes down to be closed during loading operation of the disc cartridge, inserting another disc in the loading state is prevented.

Furthermore, the loading and ejecting operations are performed by a simple construction which has the first spring, the second spring and the operating piece, and a machinery mechanism, so that an internal construction has become simpler to achieve miniaturization of the disc player.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of the patentable novelty that reside in the present invention, including all the features that would be treated as equivalents thereof by those skilled in the art to which this pertains.

What is claimed is:

1. A disc player comprising:

a housing;

a base plate provided on a bottom of the housing;

a deck provided with a spindle assembly disposed above the base plate;

a disc tray, which is provided above the deck for carrying a disc cartridge, into which the disc cartridge is inserted from a disc cartridge insertion opening of the housing;

disc cartridge loading members each having an operating piece wherein its first upper portion is connected to a side of the disc tray and its first lower portion is connected to a side of the deck, and its first lower portion has a guide projection and a portion of said deck corresponding to the first lower portion of said operating piece is provided with a vertical elongated groove into which the guide projection is slidably inserted, a first elastic member having an elastic force wherein a first end thereof is connected to a second upper portion of the operating piece and a second end thereof is connected to the deck to generate a first elastic force in an opposite direction of an insertion of the disc cartridge, and a second elastic member wherein a first end thereof is connected to a second lower portion of the operating piece and a second end thereof is connected to the deck to generate a second elastic force in a lower direction, said second elastic member mounting a disc on the top of the deck by the second elastic force when the disc is inserted;

an ejecting member for ejecting the disc cartridge in the disc tray;

elastic members of which each of first ends is located above the disc cartridge insertion opening on an inside wall of the housing to generate an elastic force in a lower direction;

a shutter plate which is provided below the elastic members on the inside wall of the housing, wherein an upper edge of the shutter plate is connected to the other ends of the elastic members in order to open and shut in the vertical direction elastically, and the shutter plate has a shape of which a bottom side is inclined in such a way that the length of an inside wall of the shutter plate is shorter than that of an outside wall of the shutter plate so that the shutter plate can be pushed upward by an end of the disc cartridge when ejecting the disc cartridge; and guide pieces which are provided at side edges of the shutter plate for guiding the shutter plate in the vertical direction without the shutter plate being separated from the housing.

2. The disc player as claimed in claim 1, further comprising an auxiliary cartridge loading member having an auxiliary operating piece wherein a top of the auxiliary operating piece is hinged on a side of said disc tray and an auxiliary guide projection is formed on a lower portion of the auxiliary operating piece, said deck has an auxiliary guide groove vertically elongated at a portion corresponding to the auxiliary guide projection so that the auxiliary guide projection is slidably connected in said auxiliary guide groove.

3. The disc player as claimed in claim 1, wherein said ejecting member includes:

a front portion having a width corresponding to that of said deck and disposed below said deck, a pressing button formed at a center of said front portion in a front direction, ejecting rods extended inward on two sides of inner walls of said front portion, a pair of guide brackets for guiding the ejecting rods inwardly and ejecting springs disposed in front of the guide brackets, respectively, inserting the ejecting rods thereinto, and elastically rebounding from said guide brackets when the ejecting rods are pushed inwardly.

4. The disc player as claimed in claim 1, wherein said first elastic member and said second elastic member are springs.

* * * * *